United States Patent
McCarty (10) Patent No.: US 9,291,280 B2
(45) Date of Patent: Mar. 22, 2016

(54) ACTUATOR APPARATUS HAVING INTERNAL PASSAGEWAYS

(75) Inventor: Michael Wildie McCarty, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 701 days.

(21) Appl. No.: 13/547,761

(22) Filed: Jul. 12, 2012

(65) Prior Publication Data

US 2014/0014859 A1 Jan. 16, 2014

(51) Int. Cl.
*F16K 27/08* (2006.01)
*F16K 31/126* (2006.01)

(52) U.S. Cl.
CPC .............. *F16K 27/08* (2013.01); *F16K 31/126* (2013.01)

(58) Field of Classification Search
CPC ................................ F16K 27/08; F16K 31/126
See application file for complete search history.

(56) References Cited

U.S. PATENT DOCUMENTS

| | | | |
|---|---|---|---|
| 2,078,553 A | 4/1937 | Allen et al. | |
| 2,132,199 A | 10/1938 | Yancey | |
| 2,783,746 A | 3/1957 | Boteler | |
| 2,882,008 A * | 4/1959 | Giauque | 251/61.4 |
| 3,206,165 A | 9/1965 | Salmon et al. | |
| 3,874,629 A | 4/1975 | Fontaine | |
| 3,892,384 A | 7/1975 | Myers | |
| 3,934,814 A | 1/1976 | Orszak | |
| 4,054,979 A | 10/1977 | Massey, Jr. | |
| 4,311,297 A * | 1/1982 | Barrington | 251/63.6 |
| 4,383,553 A | 5/1983 | Platt | |
| 4,483,512 A | 11/1984 | Drapeau | |
| 4,523,436 A | 6/1985 | Schedel et al. | |
| 4,616,804 A | 10/1986 | Sano et al. | |
| 4,671,490 A | 6/1987 | Kolenc et al. | |
| 4,763,690 A | 8/1988 | Martin | |
| 4,834,133 A | 5/1989 | LaCoste et al. | |
| 4,922,952 A * | 5/1990 | Kemmler | 137/382 |

(Continued)

FOREIGN PATENT DOCUMENTS

| | | |
|---|---|---|
| CH | 244911 | 10/1946 |
| DE | 1019378 | 11/1957 |

(Continued)

OTHER PUBLICATIONS

ARCA Regler Gmbh, "Diaphragm Actuators Series 811," MA Brochure, downloaded from http://www.arca-valve.com/index/lang/en/artikel/1119 on Mar. 14, 2014, 6 pages.

(Continued)

*Primary Examiner* — Eric Keasel
(74) *Attorney, Agent, or Firm* — Hanley, Flight & Zimmerman, LLC (57) ABSTRACT

Actuator apparatus having internal passageways are disclosed. An example apparatus includes an actuator casing having a load apparatus to define an upper pressure chamber and a lower pressure chamber. The upper pressure chamber is opposite the lower pressure chamber. A yoke is to couple to the actuator casing to a fluid valve. An internal passageway is formed in a body of the yoke to fluidly couple a control fluid to at least one of the first or the lower pressure chamber. A fluid connector assembly is positioned in the actuator casing to fluidly couple the internal passageway to the upper pressure chamber. The load apparatus is between the internal passageway of the yoke and the upper pressure chamber.

11 Claims, 8 Drawing Sheets

(56) References Cited

U.S. PATENT DOCUMENTS

| | | | |
|---|---|---|---|
| 5,288,052 | A | 2/1994 | Black et al. |
| 5,469,774 | A | 11/1995 | Kaspers |
| 5,699,664 | A | 12/1997 | LaFleur |
| 5,706,856 | A | 1/1998 | Lancaster |
| 5,722,638 | A | 3/1998 | Miller et al. |
| 5,820,106 | A | 10/1998 | Wurangian |
| 6,637,267 | B2 * | 10/2003 | Fiebelkorn et al. ............. 73/587 |
| 7,216,844 | B2 | 5/2007 | Malina et al. |
| 8,267,372 | B2 | 9/2012 | Masamura |
| 2003/0024580 | A1 | 2/2003 | Bohaychuk |
| 2006/0049375 | A1 | 3/2006 | Gossett |
| 2012/0012772 | A1 | 1/2012 | Moore et al. |
| 2013/0193356 | A1 | 8/2013 | Collison et al. |
| 2015/0240965 | A1 | 8/2015 | Arnold et al. |

FOREIGN PATENT DOCUMENTS

| | | |
|---|---|---|
| DE | 1926781 | 11/1970 |
| DE | 9210096 | 9/1992 |
| DE | 102009008493 | 8/2010 |
| EP | 0134866 | 3/1985 |
| EP | 0277309 | 8/1988 |
| EP | 0607621 | 7/1994 |
| GB | 1236631 | 6/1971 |
| GB | 2256028 | 11/1992 |
| WO | 2010087938 | 8/2010 |

OTHER PUBLICATIONS

International Bureau, "International Search Report," issued in connection with International Patent Application No. PCT/US2013/049840, mailed on Oct. 28, 2013, 4 pages.

Samson Controls, Inc., "Series 3240 Globe Control Valve Type 3241 (241) Pneumatic Control Valves Type 3241/3271 (241-1) and Type 3241/3277 (241-7)," Technical Data Sheet, Jul. 1998 Edition, 16 pages.

Emerson Process Management, "Fisher GX Control Valve and Actuator System," Product Bulletin, dated Mar. 2012, 36 pages.

Emerson Process Management, "Fisher 657 and 667 Diaphragm Actuators," Product Bulletin, dated May 2012, 16 pages.

International Searching Authority, "Written Opinion of the International Searching Authority," issued in connection with International Patent Application No. PCT/US2013/049840, mailed on Oct. 28, 2013, 7 pages.

International Bureau, "International Preliminary Report on Patentability," issued in connection with International Patent Application No. PCT/US2013/049840, mailed on Jan. 22, 2015, 9 pages.

International Searching Authority, "International Search Report," issued in connection with International Patent Application No. PCT/US2015/017415, mailed on Jun. 12, 2015, 5 pages.

International Searching Authority, "Written Opinion," issued in connection with International Patent Application No. PCT/US2015/017415, mailed on Jun. 12, 2015, 4 pages.

Arca Valves, "OPOS Interface," 1 page.

International Searching Authority, "International Preliminary Report on Patentability," issued in connection with International Application No. PCT/US20131023063, mailed on Aug. 5, 2014, 8 pages.

International Searching Authority, "Search Report," issued in connection with International Application No. PCT/US2013/023063, mailed on May 6, 2013, 3 pages.

International Searching Authority, "Written Opinion," issued in connection with International Application No. PCT/US2013/023063, mailed on May 6, 2013, 7 pages.

United States Patent and Trademark Office, "Final Office Action", issued in connection with U.S. Appl. No. 13/362,750, mailed on Jul. 28, 2014, 20 pages.

United States Patent and Trademark Office, "Final Office Action", issued in connection with U.S. Appl. No. 13/362,750, mailed on Apr. 1, 2015, 19 pages.

United States Patent and Trademark Office, "Non-Final Office Action", issued in connection with U.S. Appl. No. 13/362,750, mailed on Feb. 5, 2014, 23 pages.

United States Patent and Trademark Office, "Non-Final Office Action", issued in connection with U.S. Appl. No. 13/362,750, mailed on Dec. 29, 2014, 23 pages.

Fisher, "Type SS-114 Control Valve," Instruction Manual, Feb. 1997, 8 pages.

United States Patent and Trademark Office, "Non-Final Office Action", issued in connection with U.S. Appl. No. 14/189,627, mailed on Aug. 5, 2015, 30 pages.

* cited by examiner

ACTUATOR APPARATUS HAVING INTERNAL PASSAGEWAYS

FIELD OF THE DISCLOSURE

The present disclosure relates generally to actuators and, more specifically, to actuator apparatus having internal passageways.

BACKGROUND

Control valves are commonly used in process control systems to control the flow of process fluids. A control valve typically includes an actuator (e.g., a pneumatic actuator, a hydraulic actuator, etc.) operatively coupled to a flow control member of a fluid valve to automate the control valve. In operation, a controller (e.g., a positioner) is often employed to supply a control fluid (e.g., air) to the actuator which, in turn, positions the flow control member (e.g., a valve gate, a plug, a closure member, etc.) to a desired position relative to a valve seat to control or regulate the fluid flow through the valve.

In some examples, a yoke may be employed to couple the actuator to the fluid valve. Additionally, in some instances, the controller may be mounted to the yoke. In some examples, external tubing may be employed to fluidly couple a control fluid between the controller and a chamber (e.g., a pressure chamber) of the actuator. However, the external tubing may become damaged or dislodged, thereby affecting the accuracy of the actuator and, thus, a desired fluid flow through the valve. In other examples, an internal pathway may be defined within the yoke to fluidly couple a control fluid between a controller and a lower pressure chamber of an actuator. However, in these examples, external tubing is required to fluidly couple the control fluid between the controller and an upper pressure chamber of the actuator.

SUMMARY

An example apparatus includes an actuator casing having a load apparatus to define an upper pressure chamber and a lower pressure chamber. The upper pressure chamber is opposite the lower pressure chamber. A yoke is to couple the actuator casing to a fluid valve. An internal passageway is formed in a body of the yoke to fluidly couple a control fluid to at least one of the upper pressure chamber or the lower pressure chamber. A fluid connector assembly is positioned in the actuator casing to fluidly couple the internal passageway to the upper pressure chamber. The load apparatus is positioned between the internal passageway of the yoke and the upper pressure chamber.

An actuator apparatus includes a first end to couple to a casing of an actuator and a second end to couple to a fluid valve. A first fluid path is formed in the yoke between the first end and the second end. The first fluid path has a first outlet positioned adjacent the first end of the yoke and a first inlet positioned between the first end and the second end. The first fluid path is to fluidly couple to an upper pressure chamber of the actuator. A second fluid path is formed in the yoke between the first end and the second end. The second fluid path has a second outlet positioned adjacent the first end of the yoke and a second inlet positioned between the first end and the second end. The second fluid path is to fluidly couple to a lower pressure chamber of the actuator.

Another example apparatus includes means for actuating a fluid valve and means for attaching the means for actuating to a fluid valve. The example apparatus includes first means for fluidly coupling a control fluid to a first fluid chamber of the actuator casing. The first means for fluidly coupling is integrally formed with the means for attaching and provides the control fluid to the first fluid chamber without the use of external tubing. The example apparatus includes second means for fluidly coupling the control fluid to a second fluid chamber of the actuator casing. The second means for fluidly coupling is positioned at least partially in the first fluid chamber.

DETAILED DESCRIPTION

Example actuator assemblies disclosed herein eliminate the need to employ external tubing to fluidly couple a control fluid between a positioner or controller and a chamber (e.g., a pressure chamber) of an actuator. In particular, example actuators disclosed herein employ a yoke to fluidly couple a supply or control fluid between a positioner and a chamber (e.g., a pressure chamber) of an actuator.

More specifically, example yoke apparatus disclosed herein employ one or more internal passageways formed in a body of the yoke to fluidly couple a control fluid (e.g., pneumatic air) between the positioner and at least one of an upper pressure chamber and a lower pressure chamber of the actuator. In addition, an example actuator assembly disclosed herein employs a fluid connector assembly to fluidly couple the one or more internal passageways to the other one of the upper and lower pressure chambers. In this manner, the positioner may be fluidly coupled to the upper and lower pressure chambers of the actuator without the use of external tubing. In other words, the actuator assembly disclosed herein does not employ tubing external to a surface of the yoke and/or an actuator casing between a position and an actuator. To fluidly couple the positioner to the upper and lower pressure chambers, a positioner may be coupled or mounted to a yoke (e.g., an outside surface of the yoke) via, for example, a bracket. In turn, the one or more internal passageways formed in the body of the yoke fluidly couple an outlet port of the positioner to one or more pressure chambers of an actuator assembly. Eliminating external tubing significantly reduces or eliminates damage to external tubing that may otherwise occur, thereby increasing the accuracy and reliability of the example actuator assemblies disclosed herein.

Figure 1A:
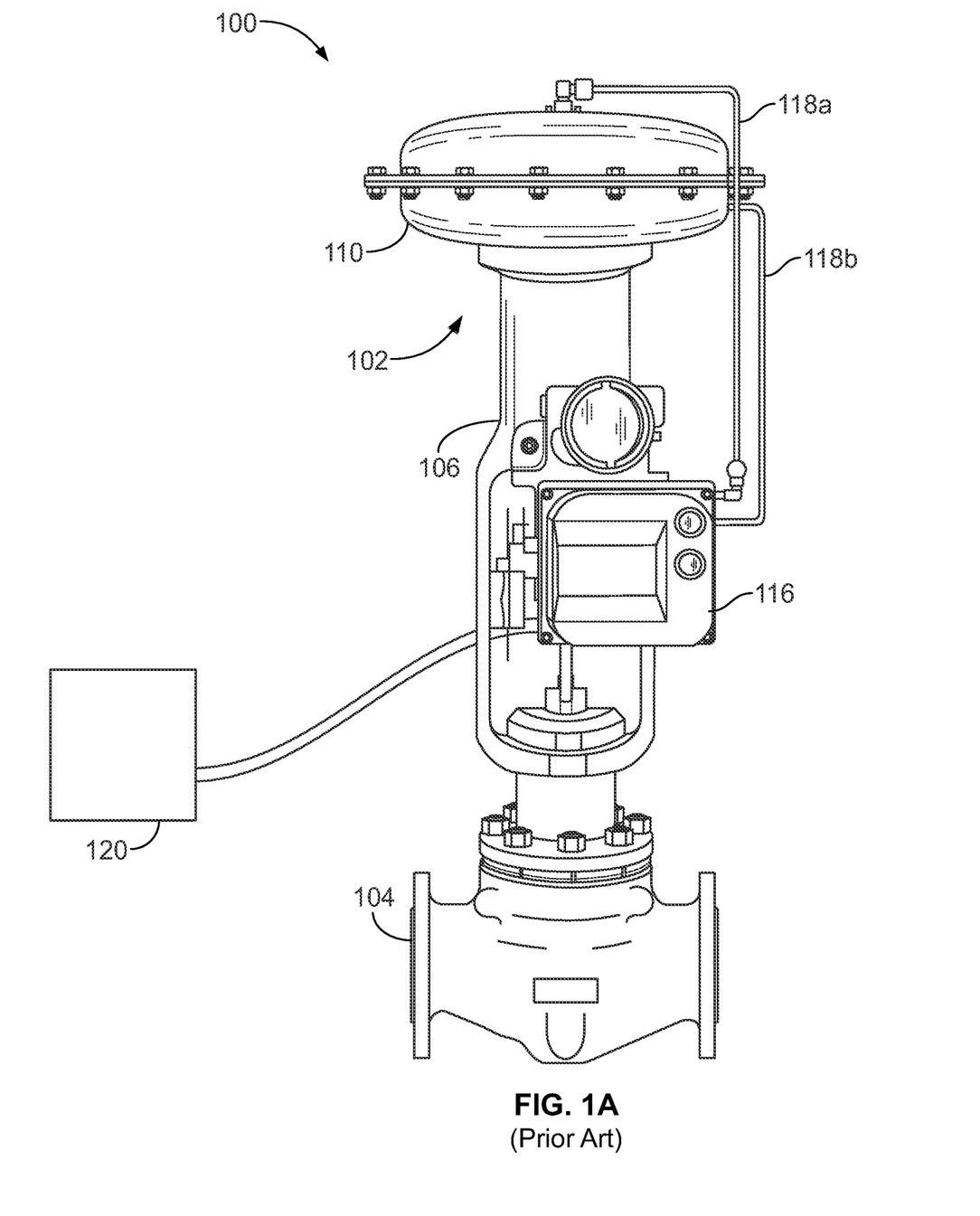
FIGS. 1A and 1B illustrate a known control valve having external tubing.
Figure 1B:
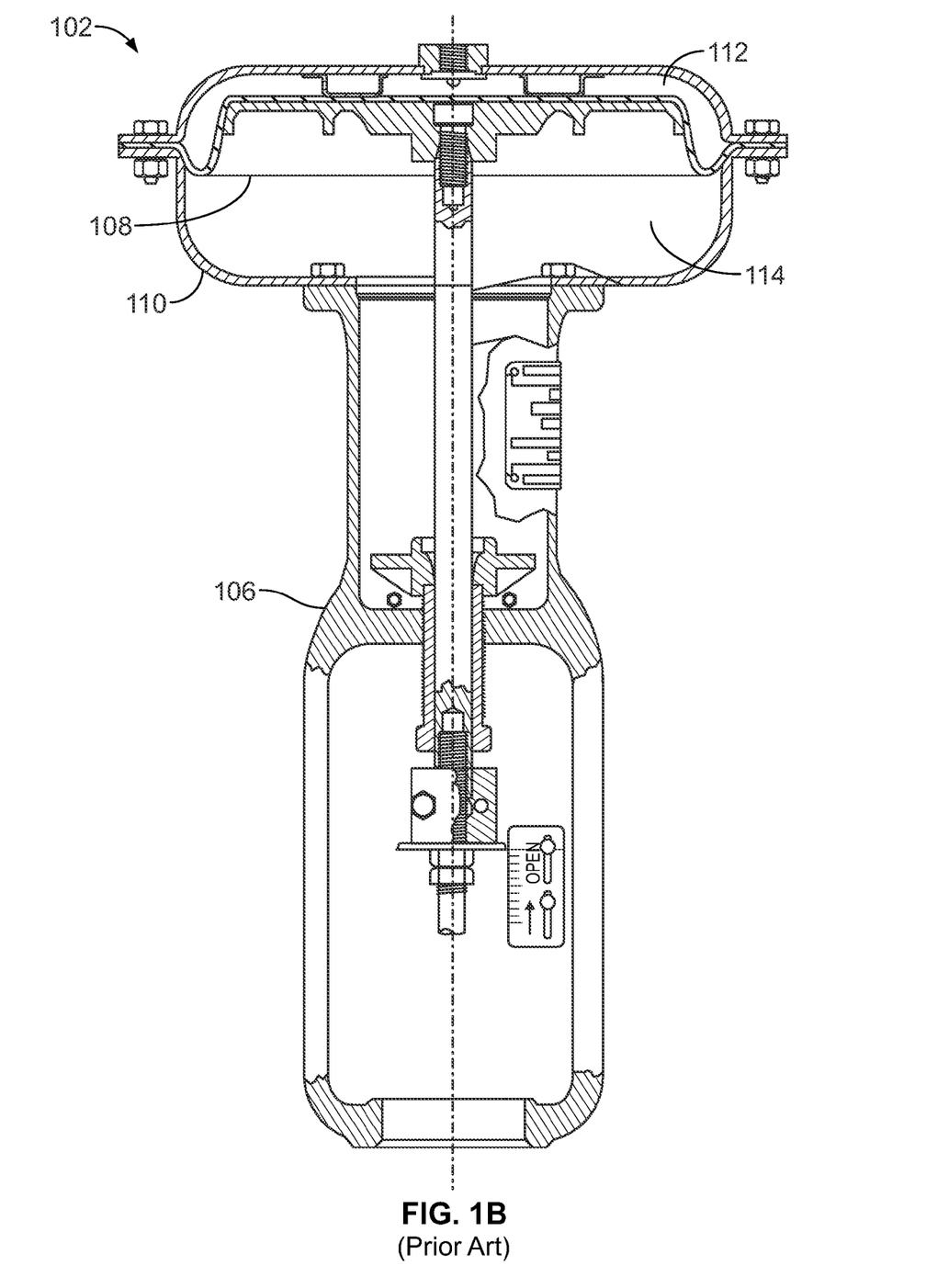

Before describing the example actuators in greater detail, a brief discussion of a known control valve assembly 100 is provided in connection with FIGS. 1A and 1B. Referring to FIGS. 1A and 1B, the control valve assembly 100 includes an actuator 102 coupled to a fluid valve 104 via a yoke 106. As shown in FIG. 1B, a diaphragm 108 is disposed in an actuator casing 110 to define an upper pressure chamber 112 and a second pressure chamber 114. A positioner 116 (FIG. 1A) provides a control fluid (e.g., pneumatic air) to the upper and lower pressure chambers 112 and 114. More specifically, external tubing 118a and 118b is employed to fluidly couple the control fluid between the positioner 116 and the pressure chambers 112 and 114, respectively.

In operation, the positioner 116 provides a control fluid from a pressure source 120 to the upper pressure chamber 112 and/or a second pressure chamber 114 to provide a pressure differential across the diaphragm 108. Such pressure differential cause the diaphragm 108 to move a valve plug operatively coupled to the diaphragm 108 in a rectilinear path relative to a valve seat (not shown) to control fluid flow through the fluid valve 104.

However, the external tubing 118a and 118b may become damaged or dislodged, thereby restricting or preventing the control fluid from flowing between the positioner 116 and/or the upper and lower pressure chambers 112 and 114. Such damage or dislodgment to the external tubing 118a and/or 118b may be caused by contact with an object, such as a vehicle. In some instances, a process fluid flowing through the fluid valve 104 may impart a frequency to the control valve assembly 100 that is substantially equal to a resonant frequency of the actuator 102 and/or the control valve assembly 100, causing the actuator 102 and/or the control valve assembly 100 and, thus, the tubing 118a and/or 118b to vibrate. In some such instances, for example, the induced vibrations may cause the external tubing 118a and 118b to become dislodged or damaged, thereby affecting the operation of the actuator 102 and, thus, the accuracy of the position of a flow control member relative to the valve seat.

Figure 2:
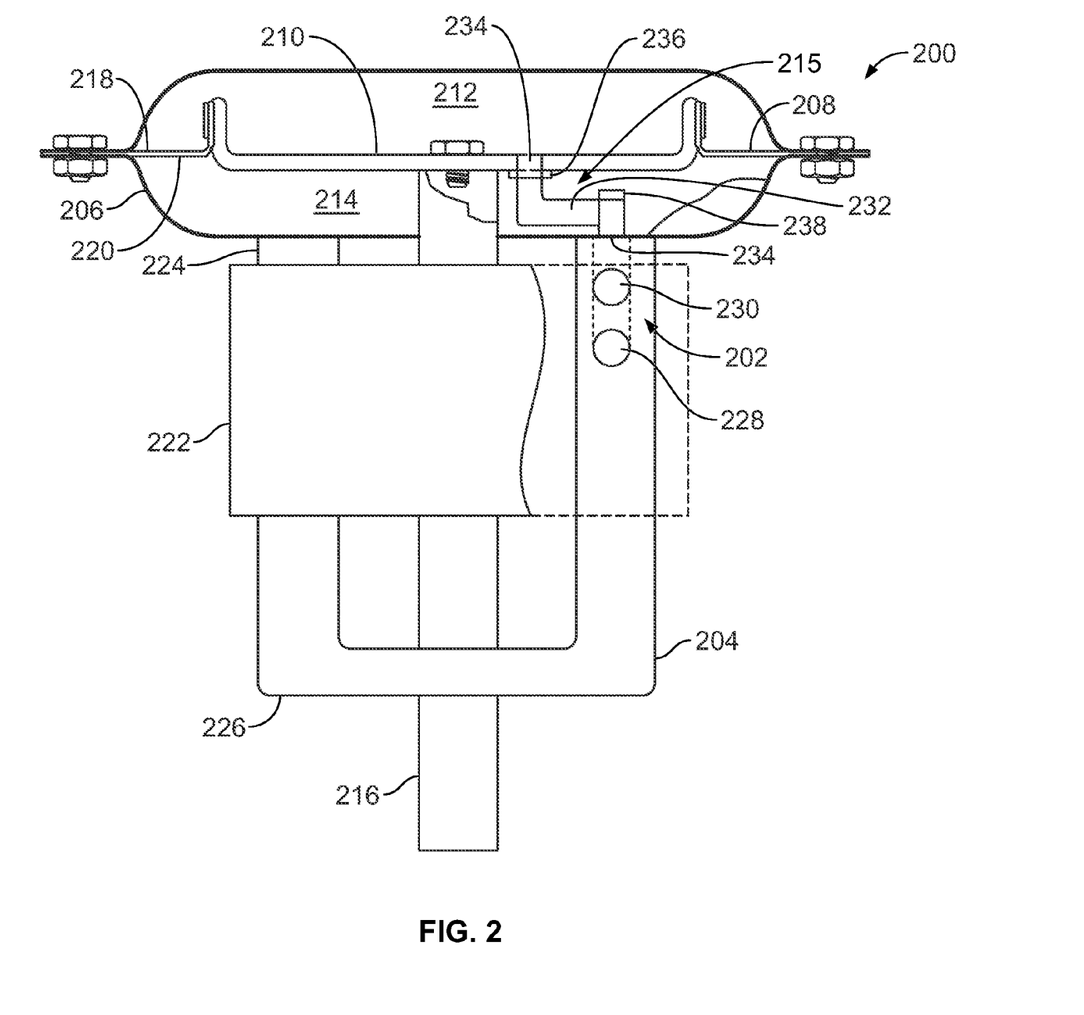
FIG. 2 illustrates an example actuator assembly disclosed herein having an internal passageway in accordance with the teachings disclosed herein.

FIG. 2 illustrates an example actuator assembly 200 having an internal passageway 202 in accordance with the teachings disclosed herein. The example actuator assembly 200 of FIG. 2 includes a yoke 204 to couple an actuator casing 206 to a fluid valve (e.g., the fluid valve 104 of FIG. 1A). The actuator assembly 200 employs a load apparatus or a diaphragm 208 positioned in the actuator casing 206 to define an upper pressure chamber 212 and a lower pressure chamber 214, the upper pressure chamber 212 being opposite the second pressure chamber 214.

More specifically and as described below, the actuator assembly 200 employs a fluid connector assembly 215 to enable the internal passageway 202 to be fluidly coupled to both and/or either of the upper and lower pressure chambers 212 and 214. In this manner, the internal passageway 202 and the fluid connector assembly 215 provide a fluid connection to the actuator casing 206 without use of tubing externally positioned relative to the yoke 204 and/or the actuator assembly 200 (e.g., a passageway adjacent an outer surface of the yoke 204 of the actuator assembly 200).

In this example, the diaphragm 208 is coupled to an actuator stem 216 via a diaphragm plate 210. For example, the diaphragm 208 is fixedly attached, clamped, fastened or otherwise coupled to the diaphragm plate 210 (e.g., via a clamp and/or a fastener). The actuator stem 216, in turn, operatively couples a flow control member of a fluid valve and the diaphragm 208. Additionally, the upper pressure chamber 212 is in fluid communication with a first side 218 of the diaphragm 208 and the lower pressure chamber 214 is in fluid communication with a second side 220 of the diaphragm 208.

As shown in FIG. 2, a positioner 222 is coupled or mounted to the yoke 204. For example, the positioner 222 may be mounted to the yoke 204 via a bracket assembly (not shown). The bracket assembly may include, for example, a bracket or plate having multiple apertures to receive fasteners. For example, at least one fastener extends through one of the apertures of the bracket to engage to the yoke 204.

The yoke 204 of the illustrated example has a first end 224 that couples to the actuator casing 206 and a second end 226 that couples to, for example, a bonnet of a fluid valve. Additionally, the internal passageway 202 fluidly couples the positioner 222 and the actuator assembly 200 and/or the casing 206. In other words, the internal passageway 202 fluidly couples a control fluid to at least one of the upper pressure chamber 212 or the lower pressure chamber 214 (e.g., adjacent an outer surface of the yoke 204 of the actuator assembly 200). More specifically, the internal passageway 202 is integrally formed with the yoke 204. In the illustrated example, the internal passageway 202 defines a first fluid path 228 and a second fluid path 230. In particular, the first fluid path 228 fluidly couples the positioner 222 (e.g., a first outlet port of the positioner 222) or the control fluid to the upper pressure chamber 212, and the second fluid path 230 fluidly couples the positioner 222 (e.g., a second outlet port of the positioner 222) or the control fluid to the lower pressure chamber 214.

Additionally, the fluid connector assembly 215 employs a first fluid passageway 232 to fluidly couple the first fluid path 228 and the upper pressure chamber 212. The first fluid passageway 232 is positioned in the lower pressure chamber 214 of the actuator casing 206. To fluidly couple the first fluid passageway 232 and the upper pressure chamber 212, an opening is formed in the diaphragm 208 and/or the diaphragm plate 210 to establish fluid communication between the first fluid passageway 232 and the upper pressure chamber 212. In particular, the first fluid passageway 232 of the illustrated example is coupled to the opening 234 via a connector 236 (e.g., a hose fitting or clamp).

Further, to accommodate for movement of the diaphragm 208, the first fluid passageway 232 of the illustrated example is formed of flexible tubing and has a sufficient length to prevent interference with the operation of the actuator assembly 200 and/or the diaphragm 208 when the actuator assembly 200 moves between a first position to allow fluid flow through the valve (e.g., an open position of the valve) and a second position to restrict fluid flow through the valve (e.g., a closed position of the valve). As a result, the combination of the first fluid passageway 232 and the first fluid path 228 eliminates the need to employ external tubing (e.g., the external tubing 118a of FIG. 1A) between the positioner 222 and the upper pressure chamber 212.

Additionally, the second fluid path 230 is fluidly coupled to the lower pressure chamber 214 via a connector 238 (e.g., a hose fitting or clamp), thereby eliminating the need to employ external tubing (e.g., the external tubing 118b of FIG. 1A) between the positioner 222 and the lower pressure chamber 214. As a result, the example yoke 204 and the fluid connector assembly 215 significantly increase the reliability of the actuator assembly 200 by significantly reducing or eliminating damage that may otherwise occur if external tubing is employed.

Figure 3A:
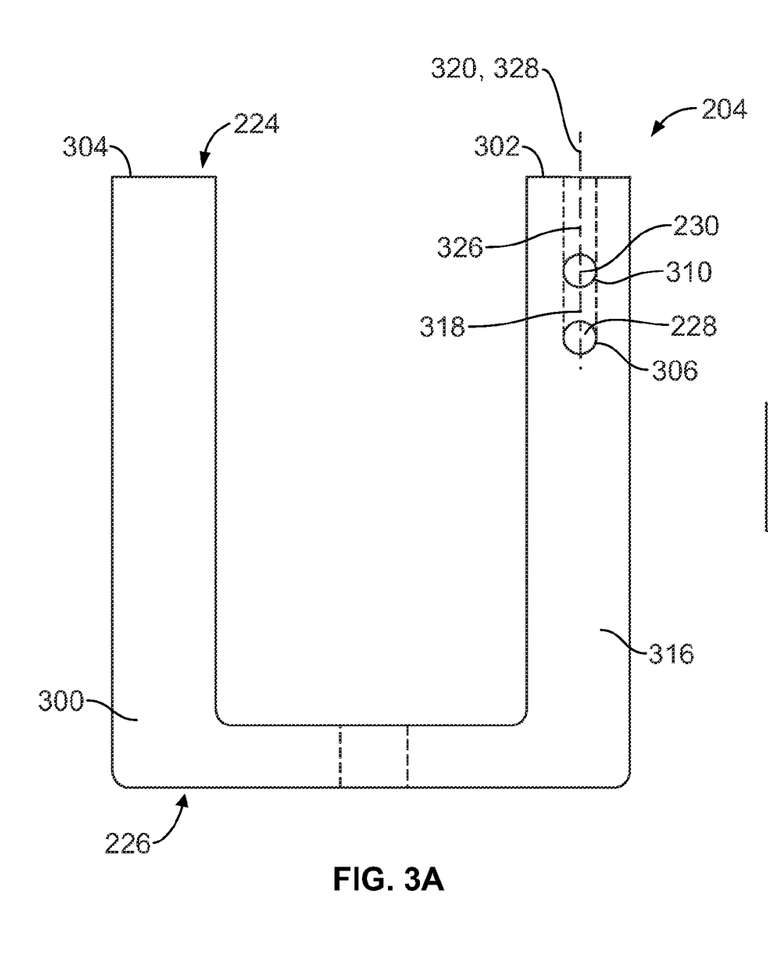
FIGS. 3A and 3B illustrate an example yoke of the example actuator assembly of FIG. 2.
Figure 3B:
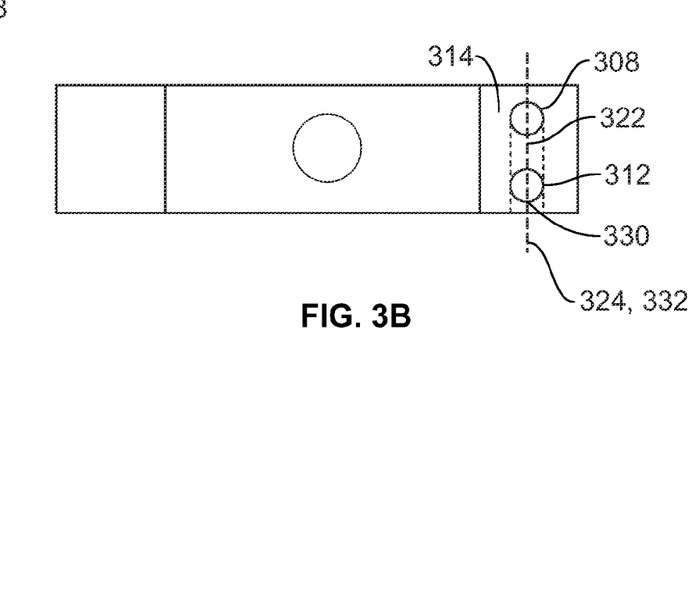

FIG. 3A is a front view of the example yoke 204 of FIG. 2. FIG. 3B is a plan view of the example yoke 204 of FIG. 2. Referring to FIGS. 3A and 3B, the yoke 204 of the illustrated example has a body 300 (e.g., a U-shaped body) that defines a first leg 302 and a second leg 304. The first fluid path 228 has a first inlet 306 (FIG. 3A) and a first outlet 308 (FIG. 3B) and the second fluid path 230 has a second inlet 310 (FIG. 3A) and a second outlet 312 (FIG. 3B). In particular, in the illustrated example, the inlet 306 of the first fluid path 228 is positioned between the first end 224 of the yoke 204 and the second end 226 of the yoke 204 and the outlet 308 of the first fluid path 228 is positioned adjacent the first end 224 of the yoke 204.

More specifically, the first outlet 308 is positioned relative to a surface 314 (e.g., a top or upper surface) of the first leg 302 of the yoke 204 and the inlet 306 is positioned relative to a surface 316 (e.g., a side surface) of the first leg 302 of the yoke 204. In other words, the surface 314 is substantially perpendicular relative to the surface 316 of the yoke 204. As a result, a first portion 318 of the first fluid path 228 defines a first axis 320 and a second portion 322 of the first fluid path 228 defines a second axis 324 such that the first axis 320 is non-parallel relative to the second axis 324. In this manner, the first portion 318 of the first fluid path 228 intersects the second portion 322 of the first fluid path 228.

Also, the inlet 310 of the second fluid path 230 is positioned between the first end 224 of the yoke 204 and the second end 226 of the yoke 204, and the outlet 312 of the second fluid path 230 is positioned adjacent the first end 224. More specifically, the second outlet 312 is positioned on the surface 314 of the yoke 204 and the second inlet 310 is positioned on the surface 316. As a result, a first portion 326 of the second fluid path 230 defines a first axis 328 and a second portion 330 defines a second axis 332 such that the first axis 328 of the second fluid path 230 is non-parallel relative to the second axis 332 of the second fluid path 230. In this manner, the first portion 326 of the second fluid path 230 intersects the second portion 330 of the second fluid path 230.

In the illustrated example, the first leg 302 defines the first and second fluid paths 228 and 230. In particular, the first fluid path 228 is adjacent the second fluid path 230. However, although the first fluid path 228 is adjacent the second fluid path 230, the first fluid path 228 is fluidly isolated relative to the second fluid path 230. Thus, the control fluid in the first fluid path 228 cannot communicate (e.g., mix) with the control fluid in the second fluid path 230.

In other examples as described below, the first fluid path 228 may be formed in the first leg 302 of the yoke 204 and the second fluid path 230 may be formed in the second leg 304 of the yoke. Additionally, in some examples, the yoke 204 may only employ a single fluid path 228 or 230. In yet other examples, the yoke 204 may employ more than two fluid paths. For example, to increase response time, each of the first and second legs 302 and 304 may include the first and second fluid paths 228 and 230.

The yoke 204 of the illustrated example may be formed via, for example, casting or any other manufacturing process. Further, the first fluid path 228 and/or the second fluid path 230 may be formed via secondary manufacturing operations such as, for example, boring, drilling and/or any other suitable manufacturing process(es).

In operation, referring to FIGS. 2, 3A, and 3B, the positioner 222 receives a control fluid from a supply source (e.g., the supply source 120 of FIG. 1A). The positioner 222 regulates the control fluid and provides the control fluid to at least one of the upper pressure chamber 212 and/or the lower pressure chamber 214. In particular, a first outlet or port of the positioner 222 is coupled to the first inlet 306 of the first fluid path 228 and a second outlet or port of the positioner 222 is coupled to the second inlet 310 of the second fluid path 230. The first fluid path 228 fluidly couples to the upper pressure chamber 212 and the second fluid path 230 fluidly couples to the lower pressure chamber 214.

In particular, the positioner 222 provides the control fluid to at least one of the upper pressure chamber 212 and/or the lower pressure chamber 214 to create a pressure differential across the diaphragm 208 to control fluid flow through a valve. For example, a pressure of the control fluid in the upper pressure chamber 212 that is greater than a pressure of the control fluid in the lower pressure chamber 214 provides a pressure differential to cause the diaphragm 208 to move in a first rectilinear path (e.g., a downward direction in the orientation of FIG. 2). Likewise, a pressure of the control fluid in the upper pressure chamber 212 that is less than the pressure of the control fluid in the lower pressure chamber 214 provides a pressure differential to cause the diaphragm 208 to move in a second rectilinear path (e.g., an upward direction in the orientation of FIG. 2) opposite the first rectilinear path. Such rectilinear movement of the diaphragm 208 positions a flow control member of a valve relative to a valve seat to regulate the fluid flow through a valve (e.g., the fluid valve 106 of FIG. 1A).

Figure 4A:
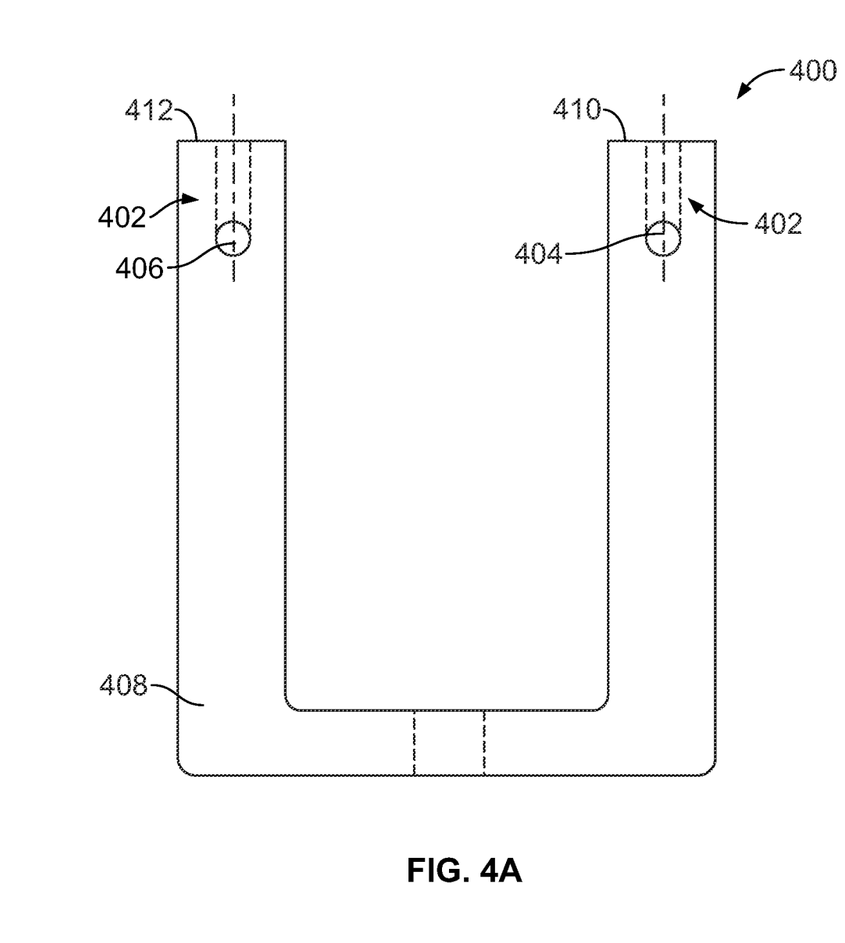
FIGS. 4A and 4B illustrate another example yoke disclosed herein having an internal passageway.
Figure 4B:
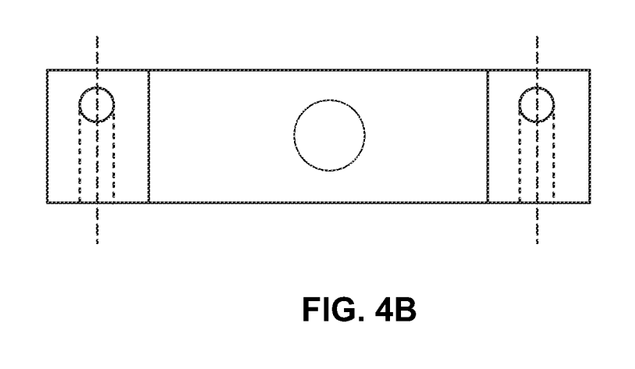

FIGS. 4A and 4B illustrate another example yoke 400 having an internal passageway 402 disclosed herein. More specifically, the internal passageway 402 defines a first fluid path 404 and a second fluid path 406. The first fluid path 404 is fluidly isolated relative to the second fluid path 406. The yoke 400 of the illustrated example has a body 408 (e.g., a U-shaped body) that defines a first leg 410 and a second leg 412. Referring to FIGS. 4A and 4B, the first fluid path 404 is formed in the first leg 410 and the second fluid path 406 is formed in the second leg 412. The first and second fluid paths 404 and 406 are configured similar to the example fluid paths 228 and 230 described above in connection with FIGS. 3A and 3B.

Figure 5:
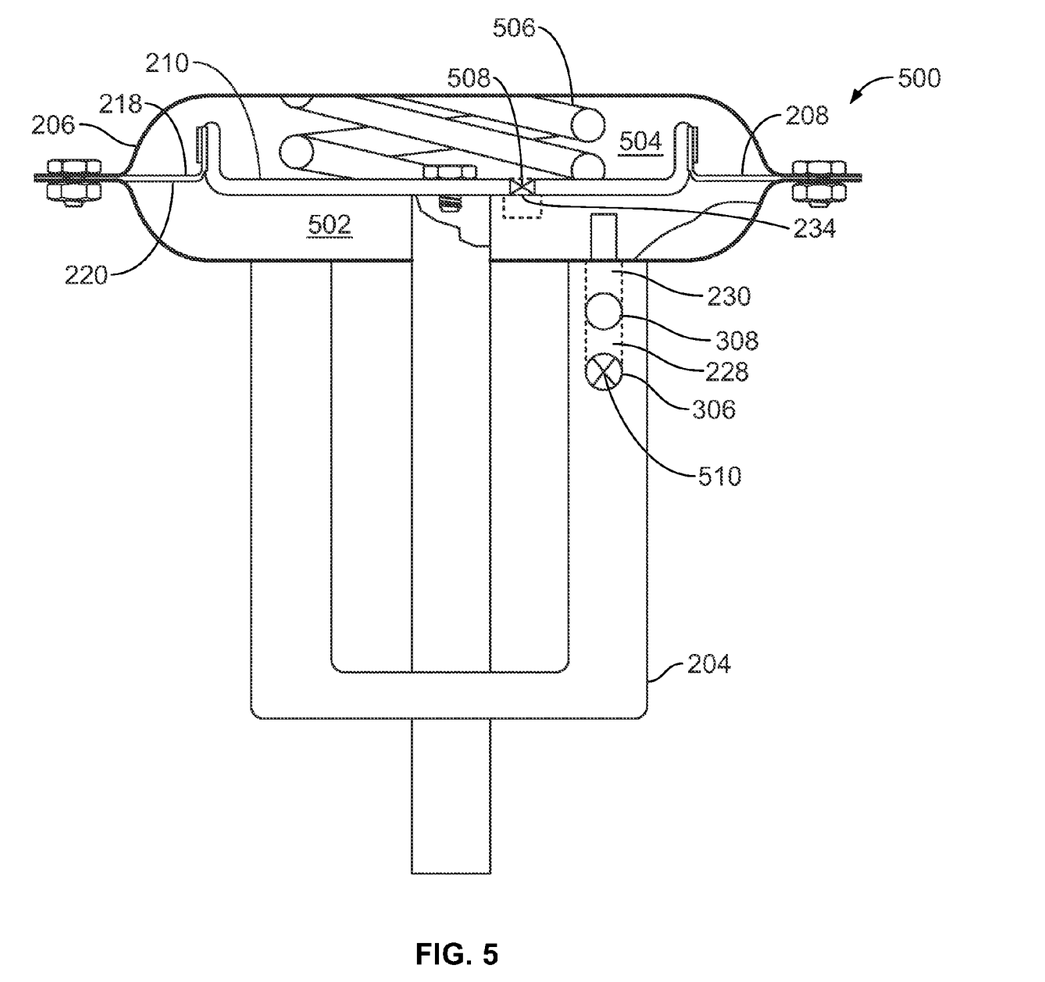
FIG. 5 illustrates another example actuator assembly disclosed herein having an internal passageway.
Figure 6:
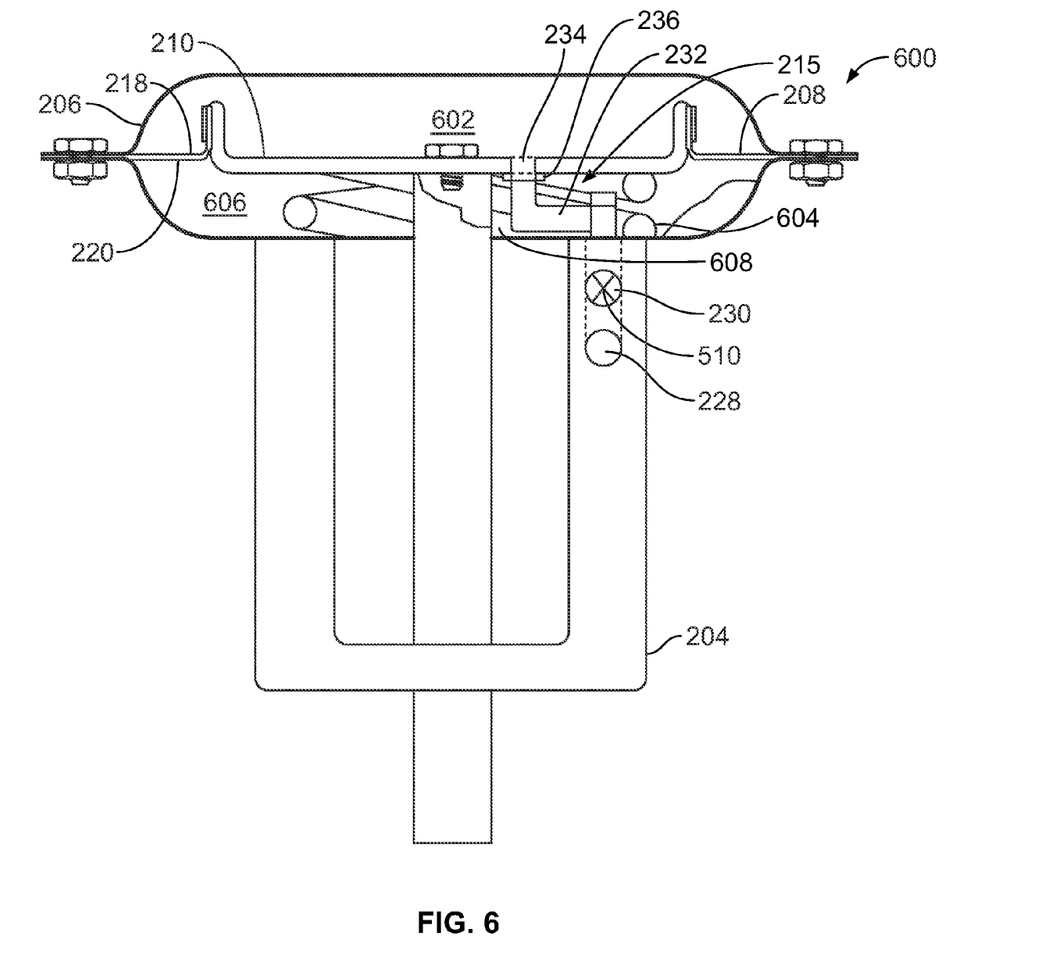
FIG. 6 illustrates another example actuator assembly disclosed herein having an internal passageway.
Figure 7:
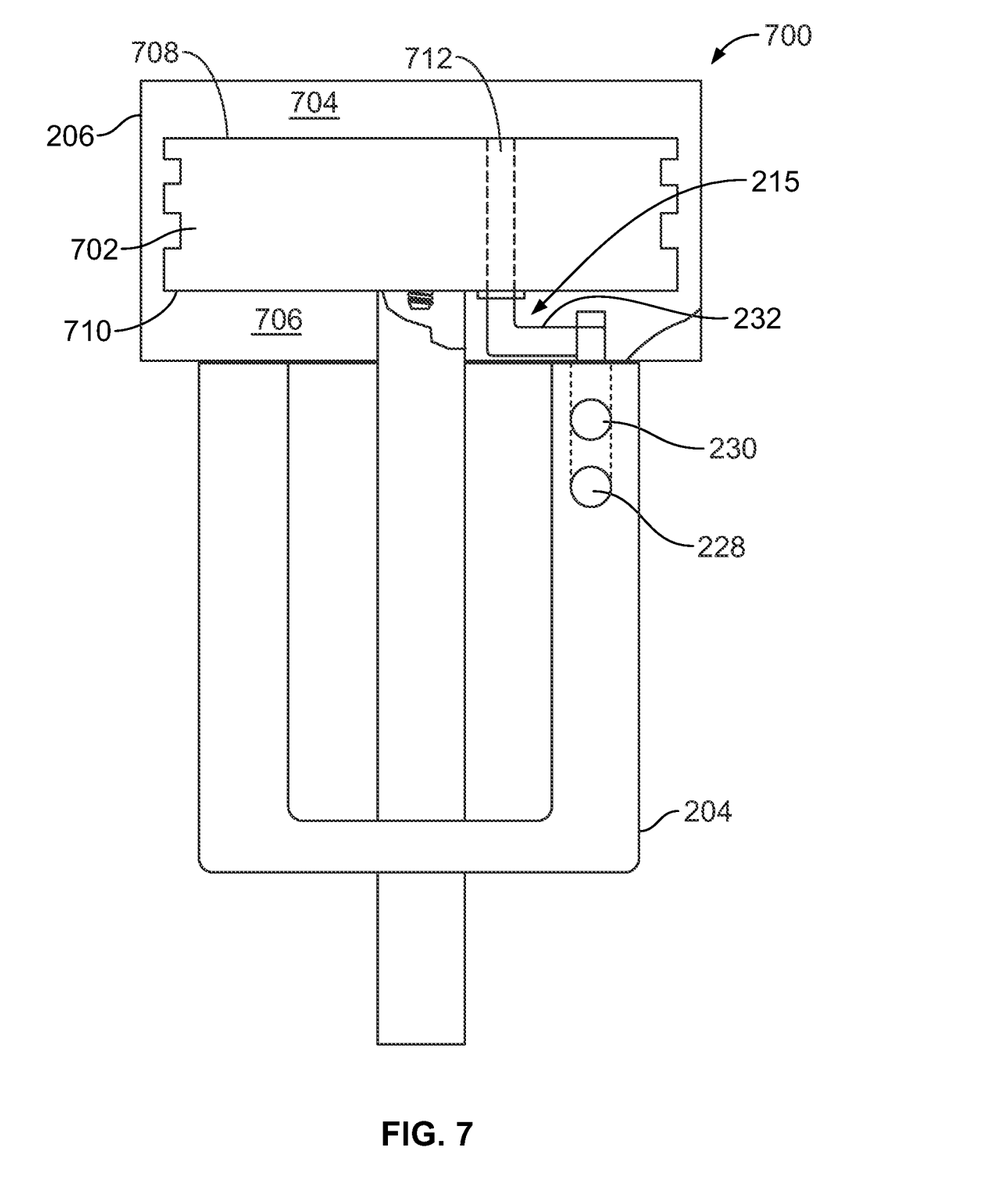
FIG. 7 illustrates another example actuator disclosed herein having an internal passageway.

FIGS. 5-7 illustrate other example actuators 500, 600, and 700 disclosed herein having an example yoke similar to the example yoke 204 of FIGS. 2, 3A, and 3B. Those components of the example actuators 500, 600, and 700 that are substantially similar or identical to the components of the example yoke 204 or the actuator assembly 200 described above and have functions substantially similar or identical to the functions of those components will not be described in detail again below. Instead, the interested reader is referred to the above corresponding descriptions. To facilitate this process, the same reference numbers will be used for like structures.

The example actuator 500 of FIG. 5 employs a yoke 204 to couple the actuator casing 206 to a fluid valve (e.g. the fluid valve 106 of FIG. 1A). The actuator 500 has the load apparatus or diaphragm 208 disposed in the actuator casing 206 to define a lower pressure chamber or fluid chamber 502 and an upper pressure chamber or spring chamber 504. A spring 506 is disposed within the spring chamber 504 and imparts a bias or force to the first side 218 of the diaphragm 208. Additionally, the fluid chamber 502 is in fluid communication with the second side 220 of the diaphragm 208.

In the illustrated example, the second fluid path 230 of the yoke 204 is fluidly coupled to the fluid chamber 502. As shown, the example actuator 500 employs a plug, cap or insert 508 to block or prevent fluid flow between the pressure chamber 502 and the spring chamber 504 via an opening 234 of the diaphragm plate 210 and/or the diaphragm 208. Additionally, as shown, a removable plug, cap, or insert 510 may be coupled to the first inlet 306 of the first fluid path 228 to prevent or restrict fluid communication to the spring chamber 504 via the first inlet 306. In some examples, the insert 510 may be removed from the first inlet 306 to fluidly couple (e.g., vent) the spring chamber 504 to atmosphere when an outlet port of the positioner 222 is not coupled to the first fluid path 228.

In operation, a positioner (e.g., the positioner 222 of FIG. 2) supplies the control fluid to the fluid chamber 502 via the second fluid path 230 to create a pressure differential across the diaphragm 208 to control a fluid flow through the fluid valve (e.g., the fluid valve 106 of FIG. 1A). For example, a pressure of the control fluid provided in the fluid chamber 502 that imparts a force on the second side 220 of the diaphragm 208 that is greater than the force imparted to the first side 218 by the spring 506 causes the diaphragm 208 to move in a first rectilinear path. Likewise, a pressure provided in the fluid chamber 502 that imparts a force to the second side 220 of the diaphragm 208 that is less than the force imparted to the first side 218 by the spring 506 causes the diaphragm 208 to move in a second rectilinear path opposite the first path.

FIG. 6 illustrates another example actuator 600 employing the example yoke 204 disclosed herein. In this example, the first fluid path 228 of the yoke 204 fluidly couples a control fluid from a positioner (e.g., the positioner 222 of FIG. 2) to an upper pressure chamber or fluid chamber 602 of the actuator 600. The fluid chamber 602 is in fluid communication with the first side 218 of the diaphragm 208. A spring 604 is disposed within a lower pressure chamber or spring chamber 606 of the actuator 600 and imparts a force to the second side 220 of the diaphragm 208. Additionally, the first fluid passageway 232 of the fluid connector assembly 215 is positioned in the spring chamber 606. The first fluid passageway 232 is coupled to the opening 234 of the diaphragm 208 and the diaphragm plate 210 via the connector 236 to fluidly couple the first fluid path 228 and the fluid chamber 602. The first fluid passageway 232 may be implemented using tubing and, in operation, does not interfere with the spring 604. In particular, the first fluid passageway 232 is positioned within a central opening 608 defined by the spring 604. In this example, the second fluid path 230 may be closed via, for example, the removable plug, cap, or insert 510. Alternatively, the insert 510 may be removed to fluidly couple (e.g., vent) the spring chamber 606 to atmosphere.

FIG. 7 illustrates yet another example actuator 700 employing a yoke 204 to couple an actuator casing 206 to a fluid valve. In this example, the load apparatus is a piston 702 disposed in the actuator casing 206 to define an upper pressure chamber 704 and a lower pressure chamber 706. The upper pressure chamber 704 is in communication with a first side 708 of the piston 702 and the second pressure chamber 706 is in communication with a second side 710 of the piston 702. Additionally, the first fluid path 228 fluidly couples the control fluid from a positioner to the upper pressure chamber 704 and the second fluid path 230 fluidly couples the control fluid to the second pressure chamber 708. The first fluid path 228 is fluidly coupled to the first fluid passageway 232. The piston 702 includes an opening 712 to fluidly couple the first fluid passageway 232 and the upper pressure chamber 704.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
   an actuator casing having a load apparatus to define an upper pressure chamber and a lower pressure chamber, the upper pressure chamber being opposite the lower pressure chamber;
   a yoke to couple the actuator casing and a fluid valve, the yoke defining a body having an internal passageway to fluidly couple a control fluid to at least one of the upper pressure chamber or the lower pressure chamber;
   a fluid connector assembly positioned in the actuator casing to fluidly couple the internal passageway to at least one of the upper pressure chamber or the lower pressure chamber, the load apparatus being positioned between the internal passageway of the yoke and the upper pressure chamber; and
   a positioner mountable to the yoke, wherein the positioner is to supply the control fluid to the internal passageway, and wherein an outlet of the positioner is coupled to an inlet of the internal passageway when the positioner is mounted to the yoke.

2. The apparatus of claim 1, wherein the load apparatus comprises a piston or a diaphragm.

3. The apparatus of claim 1, wherein the upper pressure chamber is in communication with a first side of the load apparatus and the lower pressure chamber is in communication with a second side of the load apparatus, the first side being opposite the second side.

4. The apparatus of claim 3, further comprising a spring disposed in the upper pressure chamber to bias the load apparatus to a predetermined position when the control fluid applies a force to the second side of the load apparatus that is less than a force applied to first side of the load apparatus.

5. The apparatus of claim 3, further comprising a spring disposed in the lower pressure chamber to bias the load apparatus to a predetermined position when the control fluid applies a force to the first side of the load apparatus that is less than a force applied to the second side of the load apparatus.

6. An apparatus, comprising:
   an actuator casing having a load apparatus to define an upper pressure chamber and a lower pressure chamber, the upper pressure chamber being opposite the lower pressure chamber;
   a yoke to couple the actuator casing and a fluid valve, the yoke defining a body having an internal passageway to fluidly couple a control fluid to at least one of the upper pressure chamber or the lower pressure chamber;
   a fluid connector assembly positioned in the actuator casing to fluidly couple the internal passageway to at least one of the upper pressure chamber or the lower pressure chamber, the load apparatus being positioned between the internal passageway of the yoke and the upper pressure chamber, wherein the fluid connector assembly includes a first fluid passageway disposed in the actuator casing to fluidly couple a first outlet of the internal passageway and the upper pressure chamber, and wherein the fluid connector assembly includes a coupling to couple the first fluid passageway to the load apparatus.

7. The apparatus of claim 6, wherein the load apparatus comprises an opening to fluidly couple the first fluid passageway and the upper pressure chamber.

8. The apparatus of claim 6, wherein the first fluid passageway comprises tubing.

9. An apparatus, comprising:
   an actuator casing having a load apparatus to define an upper pressure chamber and a lower pressure chamber, the upper pressure chamber being opposite the lower pressure chamber;
   a yoke to couple the actuator casing and a fluid valve, the yoke defining a body having an internal passageway to fluidly couple a control fluid to at least one of the upper pressure chamber or the lower pressure chamber, wherein the internal passageway includes:
      a first fluid path to fluidly couple to the upper pressure chamber of the actuator, the first fluid path formed in the yoke between a first end of the yoke and a second end of the yoke, the first fluid path having a first outlet positioned adjacent the first end of the yoke and a first inlet positioned between the first end and the second end; and a second fluid path to fluidly couple to the lower pressure chamber of the actuator, the second fluid path formed in the yoke between the first end and the second end, the second fluid path having a second outlet positioned adjacent the first end of the yoke and a second inlet positioned between the first end and the second end; and a fluid connector assembly positioned in the actuator casing to fluidly couple the internal passageway to at least one of the upper pressure chamber or the lower pressure chamber, the load apparatus being positioned between the internal passageway of the yoke and the upper pressure chamber.

10. The apparatus of claim 9, wherein the yoke has a U-shaped frame that defines a first leg and a second leg, and wherein the first fluid path is formed in the first leg of the U-shaped frame and the second fluid path is formed in the first leg of the U-shaped frame adjacent the first fluid path, the first fluid path being fluidly isolated from the second fluid path.

11. An apparatus, comprising:

an actuator casing having a load apparatus to define an upper pressure chamber and a lower pressure chamber, the upper pressure chamber being opposite the lower pressure chamber;

a yoke to couple the actuator casing and a fluid valve, the yoke defining a body having an internal passageway to fluidly couple a control fluid to at least one of the upper pressure chamber or the lower pressure chamber; and a fluid connector assembly positioned in the actuator casing to fluidly couple the internal passageway to at least one of the upper pressure chamber or the lower pressure chamber, the load apparatus being positioned between the internal passageway of the yoke and the upper pressure chamber, wherein the fluid connector assembly is at least partially positioned in the lower pressure chamber when the internal passageway is coupled to the upper pressure chamber.

* * * * *